Jan. 4, 1966 P. J. McKEOWN 3,227,994
AUTOMATIC EXPLOSIVE ECHO RANGING DATA PLOTTER
Filed June 4, 1962 6 Sheets-Sheet 1
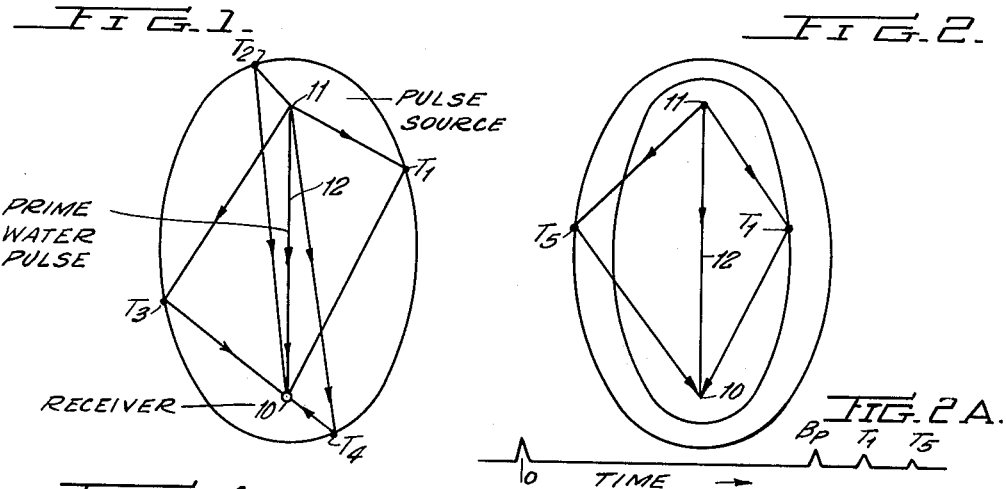
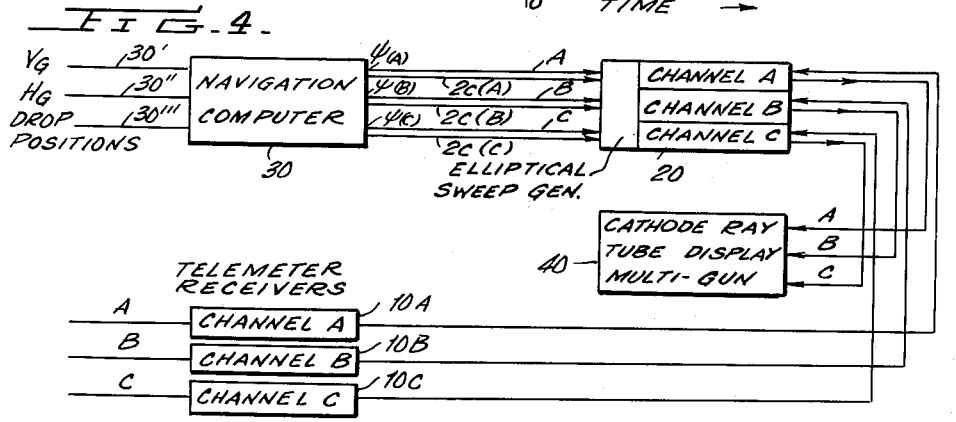
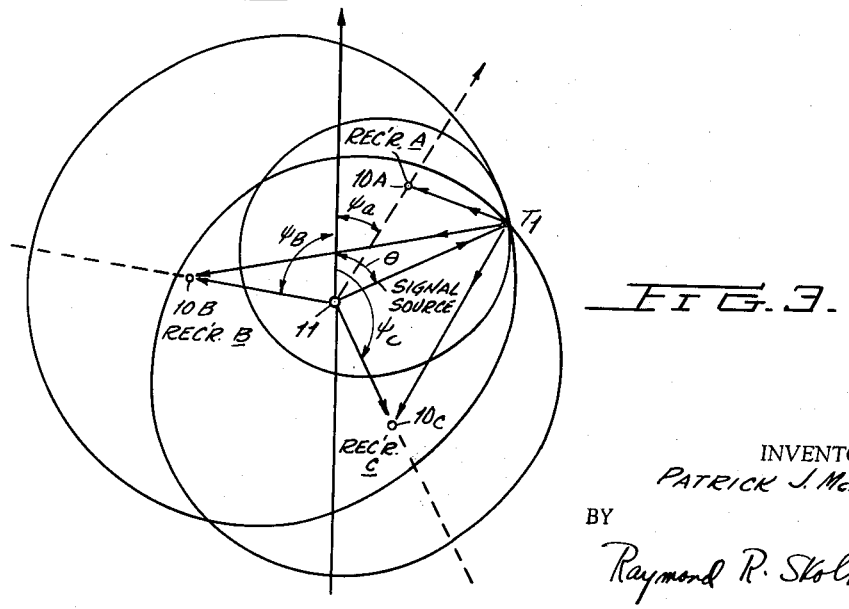
INVENTOR.
PATRICK J. McKEOWN
BY
Raymond R. Stolnick

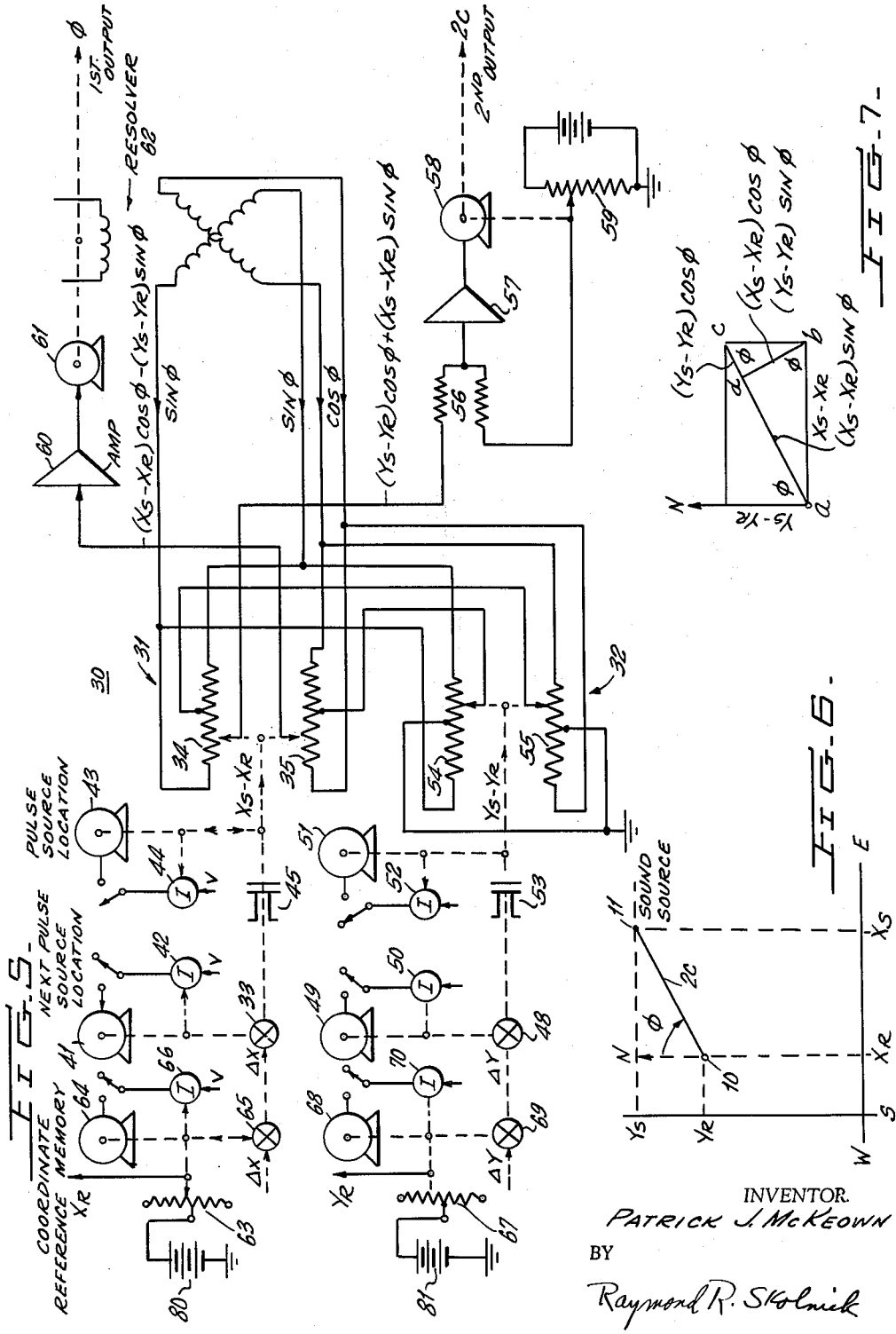

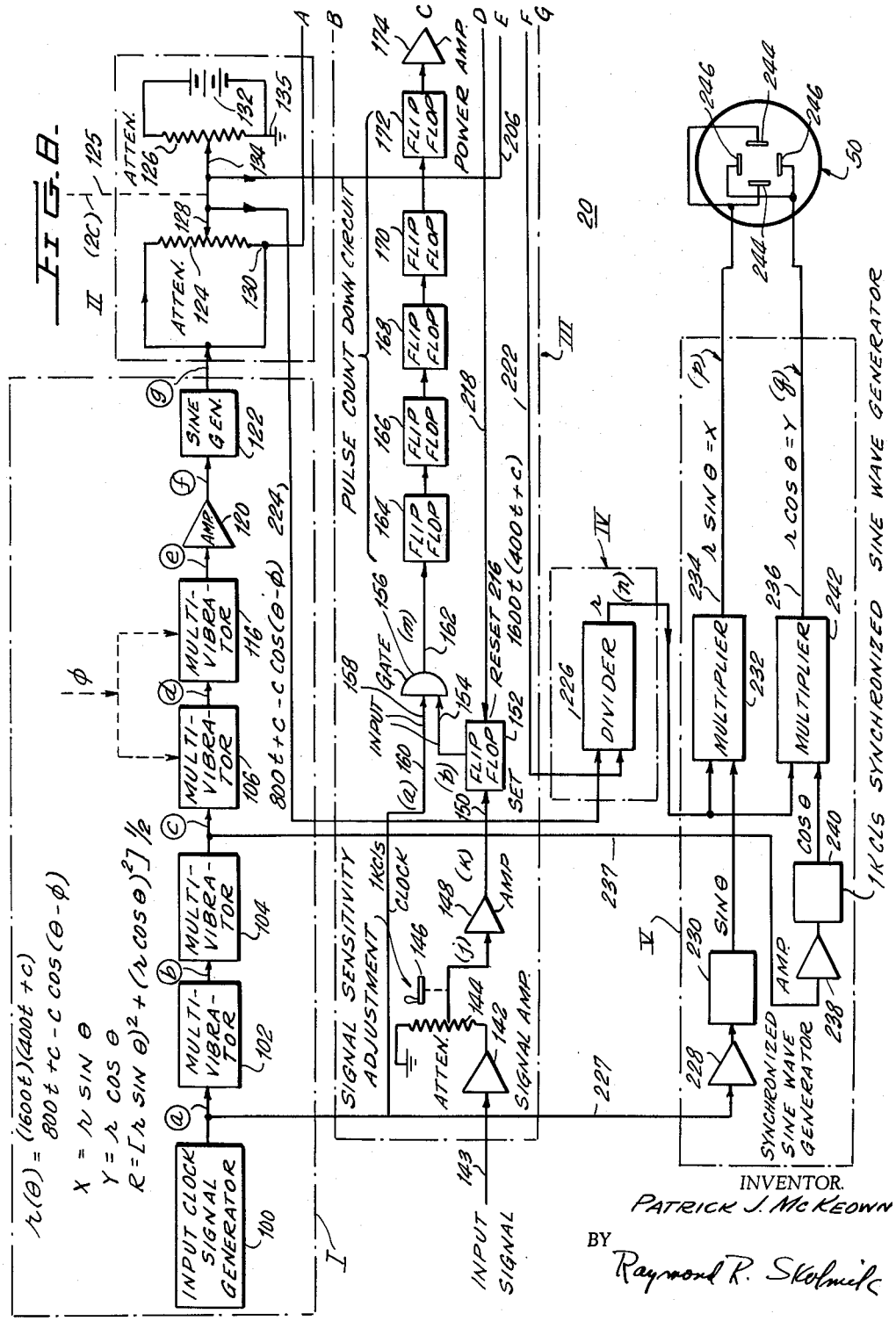

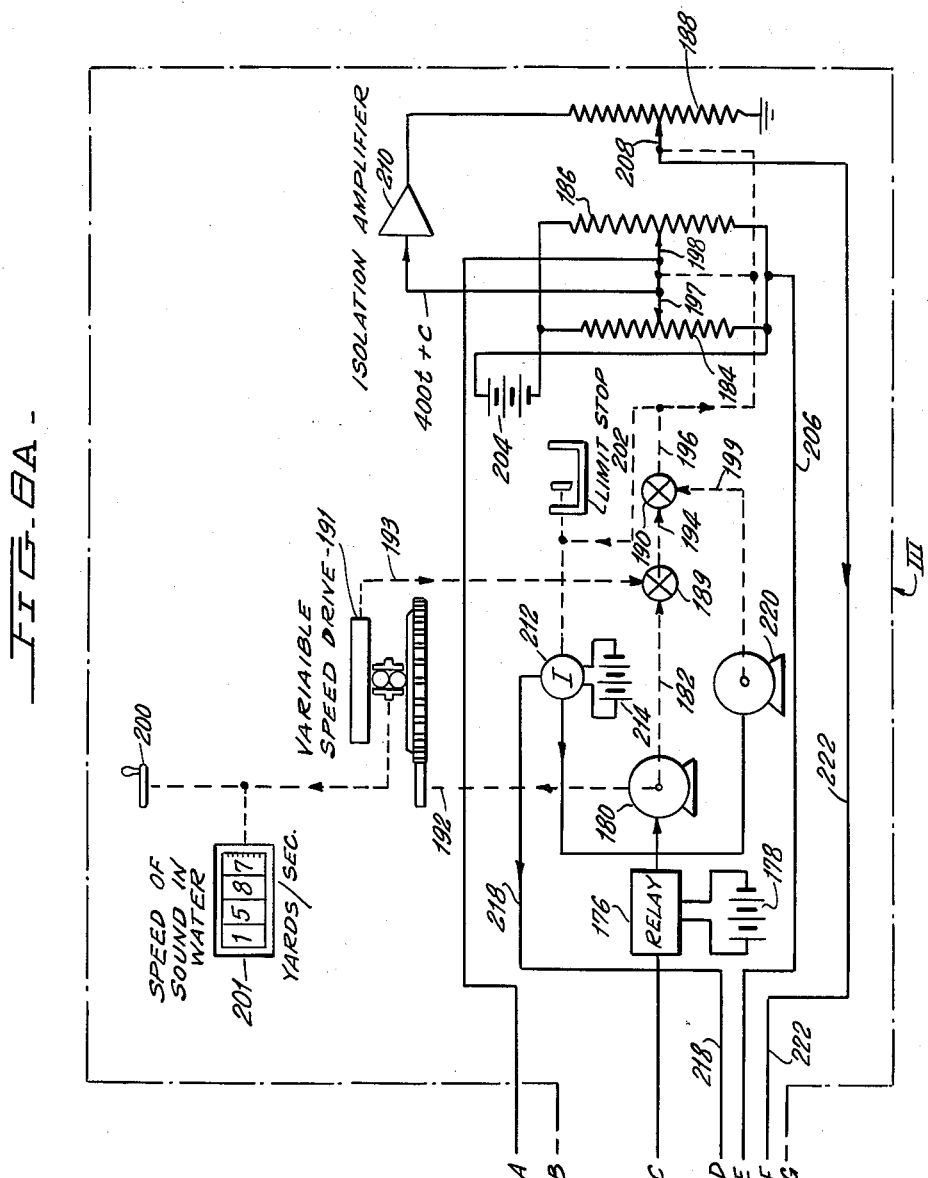

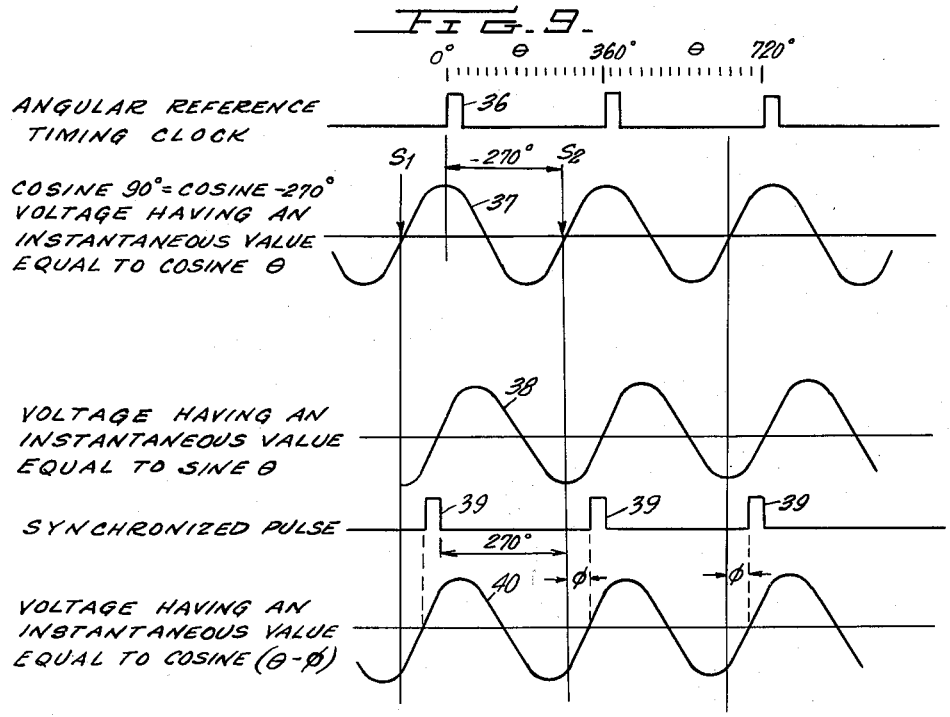
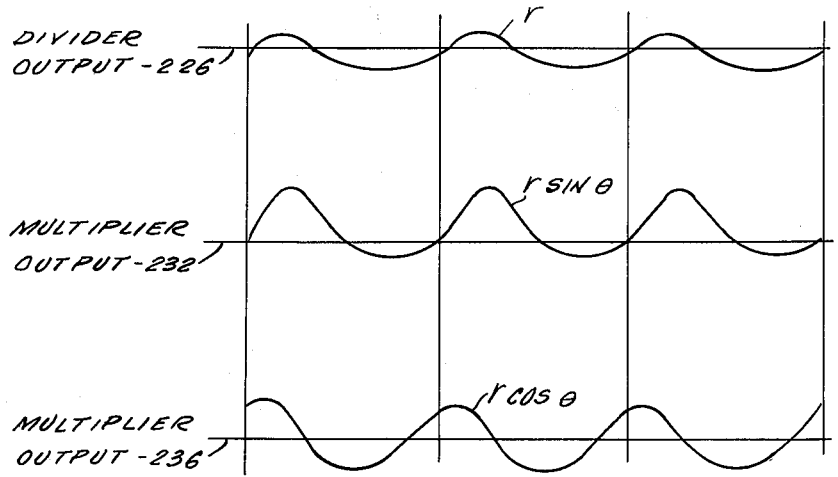

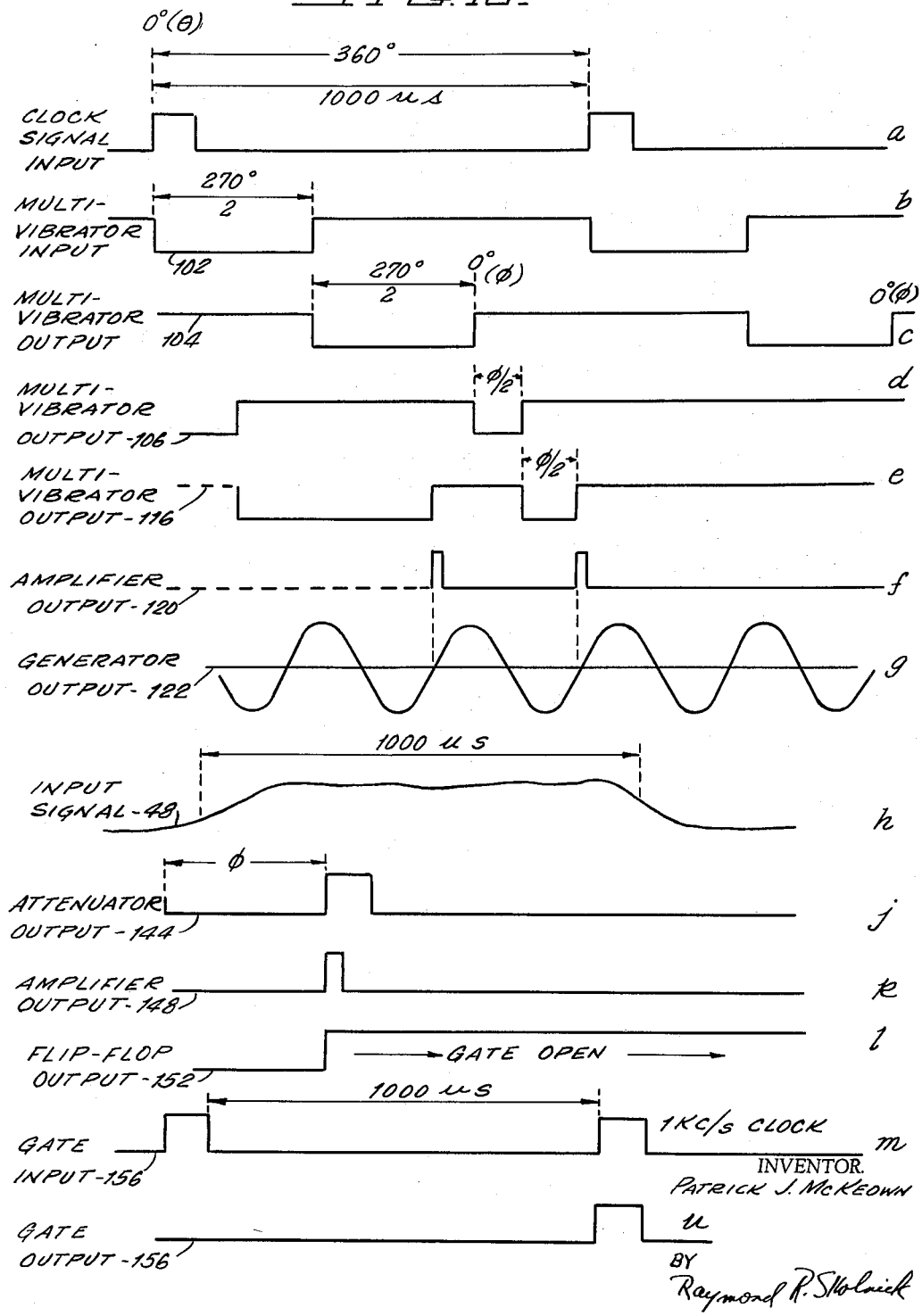

United States Patent Office 3,227,994
Patented Jan. 4, 1966

3,227,994
AUTOMATIC EXPLOSIVE ECHO RANGING
DATA PLOTTER
Patrick J. McKeown, Syosset, N.Y., assignor to Sperry
Rand Corporation, Ford Instrument Company Division,
Long Island City, N.Y., a corporation of Delaware
Filed June 4, 1962, Ser. No. 199,773
30 Claims. (Cl. 340—3)

This invention relates to a target locating system and more particularly to a method of rapidly processing the received information of an Explosive Echo Ranging (EER) system for display thereof.

A variety of communications systems are presently known to establish the location of targets within a body of water. To avoid detection of the target locating equipment, it is desirable that the receiver display station of such systems be passive; that is, not radiate any energy which may be detected by unfriendly targets to disclose its location.

One such system for determining the location of targets is described in my copending U.S patent application (F–793), Serial No. 76,935, filed 12/19/60, now U.S. Patent No. 3,112,484, entitled External Pulse Source Restituter, assigned to Sperry Rand Corporation, Ford Instrument Company Division, in which a single directional receiver operates in conjunction with a signal source to generate an ellipse establishing the locus of points which constitute all possible target positions from which a pulse of wave energy reflected from the target to the receiver arrives at a time after the direct, or prime water pulse. That system, however, suffers from the disadvantage that auxilary means must be employed to determine the distance between the receiver and the source and their orientation with respect to a reference direction. Such information must then be manually inserted into the system display. Also, such a system requires accurate synchronization between its display system and the directional antenna of its receiver.

The EER target locating system avoids the aforementioned synchronization problem by utilizing a plurality of receiver source pairs to establish a similar plurality of intersecting ellipses, the point of intersection fixing the target loction.

Heretofore it has only been known to employ either a manual or a semiautomatic technique to display the received information of such an EER target locating system. In both prior art techniques the EER data is received and plotted on a linear recorder in the form of pulses received as a function of time. A multiple track plotter is used so that the time correlation between the multiple EER channels is obvious from the resulting trace. A distance scale (usually a ruler graduated with distance markings, based on the speed of sound in water and the plotter chart speed) is placed against the chart, and the distance measurement between pulses is obtained. An elliptical template is then chosen which corresponds to this measurement, and an ellipse is plotted on the chart of the operating area having its foci corresponding to the known locations of the receiver and pulse source. This process is again repeated for the other two channels, making sure that each ellipse is plotted utilizing its associated receiver and pulse source as foci. It is seen that this is a rather cumberson and time-consuming method of data plotting.

In the semiautomatic technique auxiliary equipment is required to determine the distance between the receiver and pulse source foci and their relative bearing with respect to a reference direction. This information is manually insertable in the elliptical sweep generator of the display, and the actual plotting of the ellipse is done automatically in a manner similar to that disclosed in the single channel system of my aforementioned U.S. Patent 3,112,484. Although this technique simplifies the method of plotting EER data, it will not permit the automatic printing out in usable form of the data immediately after the receipt of the pulses. The basic objective of the instant invention is to permit such automatic use of the informtion immediately after the receipt thereof.

My invention is an improvement of these prior art systems in that it utilizes a navigational computer to automatically present the previously manually inserted information to the EER system display.

Briefly described my invention establishes three channels of information between a similar plurality of receivers and a pulse energy source located in the vicinity of the target. Alternatively, a single receiver could be used with three spaced pulse charges. However, in practice it has been found advantageous to utilize three receivers with a single pulse source. The receiver information is telemetered to a vehicle carried display system wherein three intersecting ellipses are plotted. Each ellipse represents the locus of points having a given time duration between the target reflected signal and the prime water pulse from the source to one of the receivers. The intersection of the three ellipses establishes the target location.

A navigational computer within the display vehicle automatically computes the relative distances between each receiver and the pulse source and their respective orientation, and couples this information to the display. Thus, my invention permits the multichannel information of an EER target detection system to be displayed in a more rapid manner than has heretofore been possible and therefore permits the operator to make an immediate evaluation of the received data.

In a preferred embodiment of the navigational computer, rotating shaft outputs from an existing navigational device, such as the orthogonally related well-known ASN/7 dead reckoning type computer (described in U.S. Patent No. 2,989,233, issue date, 6/20/61, entitled Rhumbline Course and Distance Computer, assigned to the assignee of the instant invention) are utilized to generate the signals presented to the display means which contain the requisite receiver and pulse source location information. Additional means are preferably included in the navigational computer to: refer the receiver and pulse source locations to an established coordinate system; permit the generation of a second set of ellipses established by the same channel receiver, in conjunction with another pulse source; and dispense with the need for external gating of the dead reckoning computer shaft output.

It is therefore a primary object of this invention to provide an EER target location system, employing automatic plotting techniques.

Another object of this invention is to provide a target locating system including an automatic navigational computer to determine parameters of an established elliptical locus.

An additional object of this invention is to provide a multichannel target locating system wherein the intersection of elliptical loci establishes a target location and means are provided for automatically displaying said loci.

A further object of this invention is to provide an automatic navigational computer for an elliptical loci sweep generator, wherein the outputs of an existing dead reckoning type computer are utilized to generate the requisite elliptical loci information.

Still another object of this invention is to provide a display system for an EER target locating system, wherein the vehicle carrying display device includes a navigational computer to automatically determine the distance between and the bearing of the disposed loci establishing receiver source channels.

Still a further object of this invention is to provide a navigational computer for an EER target locating system, including means for recording the motion of the vehicle carrying display after the depositing of the loci establishing receiver source pairs.

Still an additional object of this invention is to provide an automatic display for an EER target locating system, wherein successive elliptical loci may be established, each referred to a common coordinate system.

These as well as other objects of my invention will become apparent after reading the following description of the accompanying drawings, in which:

FIGURE 1 is a plan view showing a single channel of the EER Data System Display wherein a plurality of targets are located at a single elliptical locus;

FIGURE 2 is a similar plan view of a single channel display wherein targets are located along different elliptical loci;

FIG. 2A is an illustration of the time relationship of the signals which are displayed in FIG. 2;

FIGURE 3 illustrates the display of the three channel EER Data System wherein intersecting elliptical loci fix the position of the traget;

FIGURE 4 is a block diagram showing the complete system in accordance with the teachings of my invention;

FIGURE 5 is a schematic of the automatic navigational computer of a single channel as constructed in accordance with my invention;

FIGURES 6 and 7 illustrate the basic trigonometrical relationships utilized in the computer of FIGURE 5 to determine the requisite information.

FIGURES 8 and 8a are block diagrams, partly in schematic, for one of the channels of the elliptical sweep generator of the EER Data Plotting System;

FIGURE 9 illustrates wave forms to explain how a cosine as required by the apparatus of FIGURES 8, 8a can be generated by a standard sine generator; and FIGURES 10 and 10a illustrate wave form signals as they appear at identified locations of FIGURES 8, 8a.

Referring to FIGURE 1 pulse source 11 and omnidirectional receiver 10 are placed in the targent containing medium (i.e., a body of water) and are designed to locate the positions of targets such as $t-1$ through $t-4$. Pulse source 11 is preferably, though not necessarily, explosive in nature. The prime water pulse proceeds from pulse source 11 to receiver 10 as a direct ray 12. A plurality of reflected rays received from the various targets, as for example, from pulse source 11 to $t-1$ and from $t-1$ to 10; from pulse source 11 to $t-2$ and from $t-2$ to 10; from pulse source 11 to $t-3$ and from $t-3$ to 10; from pulse source 11 to $t-4$ and from $t-4$ to 10. The direct pulse from source 11 and reflected pulses from the targets will be received at receiver 10 in the order determined by the length of the respective overall sound paths, assuming that the sound paths are straight. Although this assumption is oftentimes not absolutely true, the deviation therefrom will not effect a reasonable accurate determination of the target position, and is commonly made in all such computations.

The prime water pulse 12 will always be received at receiver 11 as a first pulse because of the shorter distance that it travels than the reflected pulses. In the exemplary illustration of FIGURE 1, the reflected signals of targets $t-1$ through $t-4$ are presented to receiver 11 at the same instant of time and therefore lie within the same elliptical loci, of which points 10 and 11 are the foci. This results from the mathematical properties of an ellipse, which may be defined as the locus of all points for which the sum of the distance from or to two fixed points is constant.

To resolve this ambiguity a plurality of receiver channels are used to establish a similar plurality of intersecting ellipses. Should two channels be used, as by using two receivers with a single pulse source, the indirect echo from the pulse source to the target and on the two different receivers will travel along two different paths. This will establish two different ellipses having the pulse source as a common focus and the two receivers as the remaining focus of each ellipse. Since these two ellipses have a common focus, they intersect at two points; the two intersecting points serving to further resolve the ambiguity of traget location. To definitely establish the location of the target a third receiver is employed also having the source as a common foci, and the intersection of the three ellipses will be at a single point, as shown in FIGURE 3, to thereby establish the target location. It is the purpose of this invention to automatically produce a display as shown in FIGURE 3 immediately upon receipt of the telemetered pulses from the receiver to the display device.

It is thus seen that the use of the single ellipse to establish the position of a target, as shown in FIGURES 1 and 2, merely locates an elliptical locus with ambiguity as to the position of the target within the established locus. FIGURE 2 illustrates the situation wherein the reflected signal from target $t-5$ is presented to receiver 10 at a later time than the target $t-1$ reflected signal. Hence, it is established that the locus of each of these signals constitutes different ellipses with respect to the foci 10 and 11.

In a practical embodiment of this invention a vehicle such as an airplane deposits the receivers and the source in the vicinity of the target to establish concurrent separate broadcasting channels of loci information. Each receiver with the common pulse source serves as the focus of one such ellipse as shown in FIGURE 3. The information from the receiver is telemetered to the vehicle which contains a means for displaying this information. In accordance with my invention the vehicle also contains a navigational computer operably related to the deposit of the receivers and the pulse source in the target medium to compute their relative distance and bearing.

FIGURE 4 depicts the system in block diagram. The receivers 10a, 10b, 10c telemeter their information to elliptical sweep generator 20 having similar channels A, B, C. A navigational computer 30 on the vehicle has three inputs 30', 30" and 30'''. 30' and 30" correspond to the outputs of a readily available navigational device, such as a dead reckoning computer having a rotating shaft output indicative of the North-South and East-West displacement of the vehicle. Input 30''' presents information responsive to the dropping of the individual receivers and pulse source into the target containing medium. Navigational computer 30 is a three channel device presenting inputs to the elliptical sweep generator channels indicative of the distance between the foci of each channel and the relative direction of the principal axis of the elliptical locus with respect to a reference bearing.

The elliptical sweep generator 20 produces the sweep voltages, which are then presented to cathode ray tube display 40 for presenting the elliptical loci. Cathode ray tube display 40 is designed in a manner well-known in the art to simultaneously accept the outputs of the three channel elliptical sweep generator and display the three ellipses on its face. Display 40 may for example contain three inputs 30', 30" and 30'''. 30' and 30" corresponate the multichannel information on its face. Alternatively, a single gun might be employed with the multichannel information multiplexed thereto at a rate related to the persistence of the tube face and the rate of change of the input data. As an additional alternative, a multicolor tube face could be employed with each of the ellipses being displayed in a different color. The cathode ray tube display will also have provision for brightening of the scope trace as a function of the received signal level, so that no illiptical trace will appear on the screen if there are no return signals. Inasmuch as numerous cathode ray tube devices presently exist for displaying such information, no further discussion is deemed to be necessary as to the particular manner of its operation.

As has been shown in my aforementioned U.S. Patent No. 3,112,484, the position of a target on the elliptical locus may be represented as:

$$r_\theta = \frac{(1600t)(400t+C)}{800t+C-C\cos(\theta-\phi)} \quad (1)$$

where:

$r$ corresponds to the target location on the generator elliptical foci;

$\theta$ corresponds to the angular displacement of a line from the common focus to the target with respect to a reference direction;

$\phi$ corresponds to the angular displacement of the principal axis of the ellipse with respect to the same reference direction;

$C = \frac{1}{2}$ the distance between the common signal source and channel receiver;

$t$ = the time duration at the channel receiver between the reception of the prime water pulse and the target reflected pulses.

The reference direction chosen for the measurement of the angles $\theta$ and $\phi$ is preferably, though not necessarily, taken as true North. This will advantageously permit the design of the navigational computer 30, as will be set forth below.

The elliptical sweep generator of each of the channels is designed to present voltages in accordance with Formula 1 to the deflection plates of the display device. This function is preferably resolved into a sine $\theta$ and cosine $\phi$ function which is presented to the horizontal and vertical deflection plates of the cathode ray tube display to generate the requisite elliptical display, in the manner set forth in my aforementioned U.S. Patent No. 3,112,484. In the elliptical sweep generator described in that patent application it was necessary to manually insert the angle $\phi$ and the distance 2C into the equipment. My display system incorporates a navigational computer 30 to automatically and continuously compute this information and present it to the elliptical sweep generator so as to improve the operating speed of the equipment.

Reference is now made to FIGURES 5–7, which illustrate the operation of my navigational computer. FIGURE 6 shows an exemplary coordinate system, wherein the Y axis is arbitrarily chosen as true North. The distance 2C between receiver 10 and sound source 11 may be resolved into X and Y components of $(X_s - X_r)$ and $(Y_s - Y_r)$, respectively. Thus, 2C which is the hypotenuse of a right triangle may be represented as:

$$2C = [(X_s - X_r)^2 + (Y_s - Y_r)^2]^{1/2} \quad (2)$$

Reference is now made to FIGURE 7 which illustrates the trigonometric relationship established by the receiver and sound source of FIGURE 6. If a perpendicular is dropped from point $b$ to intersect diagonal $ac$ at $d$, it may be shown that angles $abd$ and $acb$ are both equal to $\phi$. This permits line $bd$ to be expressed as either $(X_s - X_r)\cos\phi$ or $(Y_s - Y_r)\sin\phi$. Also, distances $da$ and $dc$ may be represented as $(X_s - X_r)\sin\phi$ and $(Y_s - Y_r)\cos\phi$, respectively. Substituting these values in the previously derived expression for 2C will yield:

$$2C = (Y_s - Y_r)\cos\phi + (X_s - X_r)\sin\phi \quad (3)$$

Also, the dual expression for length $bd$ permits the following identity:

$$(Y_s - Y_r)\sin\phi = (X_s - X_r)\cos\phi \quad (4)$$

Equations 3 and 4 above, are utilized in navigational computer 30 to determine the angle $\phi$ and foci distance 2C.

As previously mentioned, the vehicle carrying the display device will be equipped with a conventional navigational device having a rotating mechanical shaft output indicative of the $\Delta X$ (E-W) and $\Delta Y$ (N-S) displacement of the vehicle. Navigational computer 30 will have three channels, each designed to ascertain $\phi$ and 2C for one of the telemetered channels A, B, C. The following discussion will consider only the computer of one such channel, with it being naturally understood that similar computers are established for each of the other channels.

Computer 30 contains X and Y combining circuits 31 and 32, respectively. Each combining circuit is fed the resolved component of the signal to receiver displacement of that particular channel, as shown in FIGURES 6 and 7. At the instant the vehicle deposits receiver 10 in the water, the brake on motor 43 is released, permitting the rotation of the input gear of differential 33 to be transferred through and drive the wipers of potentiometers 34 and 35. At this time the other input gear of differential 33 is held fixed by the brake motor 41, the purpose of which will be set forth below. The displacement of the wipers of potentiometers 34 and 35 is recorded on the geared switch 44, the purpose of which will also be set forth below. The displacement of the wipers of potentiometers 34 and 35 is permitted until the vehicle deposits the sound source constituting the other focus of the ellipse. At that instant the brake on motor 43 is locked, preventing further motion of the wipers of the potentiometers 34 and 35. Thus, it is seen that the wipers of potentiometers 34 and 35 will be displaced an amount related to the X displacement of the vehicle between the depositing of the receiver and the source associated with its particular channel. During this time an identical action has been occurring in the Y line, where the analagous components have been actuated and displaced in accordance with the $\Delta Y$ motion of the vehicle with respect to the receiver and pulse source. Hence, at the instant of the depositing of the pulse source, the brake on motor 51 will be locked and the $\Delta Y$ component of the vehicle motion is stored in potentiometers 54 and 55. Potentiometers 34 and 35 therefore produce the computing function $(X_s - Y_r)$ and potentiometers 54 and 55 have the values $(Y_s - Y_r)$ measured by the mechanical displacement of their wipers from the center or zero position.

A sine cosine resolver 62 of the type well-known in the art excites these potentiometers, with potentiometers 34 and 54 being excited by the sine winding of resolver 62, and potentiometers 35 and 55 being excited by the cosine winding of that resolver. Resolver 62 is initially at an arbitrary position.

The output of potentiometer 54 $(Y_s - Y_r)$ sine $\phi$ is serially subtracted from the value of potentiometer 35 $(X_s - X_r)$ cosin $\phi$, and the difference applied to amplifier 60.

Amplifier 60 is designed to drive motor 61 geared to the input of resolver 62 until the sine and cosine outputs of this resolver, as adjusted by the potentiometers 54 and 35, balance at the point of application to the amplifier 60. At the existence of a node the identity of Equation 4 above is satisfied, and motor 61 will stop running with the shaft position of resolver 62 being a function of the angle $\phi$. Thus, navigational computer 30 is seen to operate on the output signals of a conventional dead reckoning type of computer device to obtain a first output signal representative of the orientation of the major axis of the establishment elliptical locus with respect to a reference direction.

The output of potentionmeter 55 $(Y_s - Y_r)$ cosine $\phi$, is serially added to the output of potentiometer 34 $(X_s - X_r)$ sine $\phi$, and the sum applied as one input to the resistor network 56. Amplifier 57, motor 58 and potentiometer 59 comprise a self-balancing servo ssytem which drives the wiper of potentiometer 49 until the voltage out of that wiper is equal to the input of network 56 previously described. The node position of the network satisfies Equation 3 above, with the mechanical position of the wiper of potentiometer 59 being a function of the distance 2C. Thus it is seen that navigational computer 30 will establish a second output signal related to the spaced-apart distance between the receiver and sound source of the channel.

Geared switches or switches connected to intermittent drives 42 and 50 permit the use of a second pulse source in conjunction with the channelized receivers to obtain a further refinement of the target location.

After the depositing of pulse source 11 the brakes of motors 41 and 49 are released so that any further motion of the vehicle is recorded in geared switches 42 and 50 through the action of the locking of the output gears of differentials 33 and 48 by brake motors 43 and 51. At the instant that such a second pulse source is deposited in the water, the brakes of all four motors 41, 43, 49 and 51 are released while the electrical connections between geared switch 42, motor 41 and geared switch 50 and motor 49 are completed. This permits the motors 41 and 49 to drive the stored position components out of storage in the geared switches 42, 50 and into the potentiometers 34, 35, 54 and 55. The position of the wipers will now correspond with the new pulse source in relation to the same receiver as that previously deposited. When the entire value has been run out of storage, the brake is applied to motors 43 and 51, fixing the position of the potentiometer wipers for the new generation of ellipses having the newly computed values of $\phi$ and 2C. Should it be desired to further refine the location of the target with additional pulse sources, the information subsequently stored in geared switches 42 and 50 may be again used to drive the wiper arms of the potentiometers Members 63-70 are provided to relate the X and Y components to a particular coordinate reference. That is, if it is desired to deposit a new set of receivers and pulse sources within the framework of an existing coordinate system, these members are utilized to store the previously established coordinates. To best understand their operation first assume that all elements are initially at their zero positions, and no information is stored therein. For purposes of clarity, the X line only will be described, with it being understood that the Y line operates in the same manner. At the time the vehicle is at the arbitrarily designated reference position, the navigational computer is actuated in the following manner. Clutch 45 is closed while motors 41 and 43 are braked, thereby locking the output gearing line of differential 65. Motor 64 brake is released, allowing the X displacement from the reference point to position the wiper of potentiometer 63 and be stored in geared switch 66. At the moment the receiver (of the particular channel under consideration) is deposited in the water, the brake of motor 64 is locked, and that of motor 43 is released, permitting the wipers of potentiometers 34 and 35 to store the X displacement of the vehicle between the receiver and the pulse source, as described above. Thus it is seen that potentiometer 63 will record the X displacement of the receiver with respect to the established reference point. This reference voltage may be used to displace the origin of the elliptical locus from the center of the cathode ray tube display in order to provide the true geographical relationship between the three ellipses. Potentiometer 63 is preferably center tapped so that an additional voltage 80 may be superimposed to this displacement. This additional voltage may be a function of the motion of the vehicle itself, and would be applied where it is desirable to combine the radar picture of the locality with the elliptical display, thus providing a ground stabilized picture of the area. Where it is not desired to combine the elliptical and radar displays, the center tap of potentiometer 63 may be grounded.

If the use of a particular set of receivers is to be discontinued while it is desirable to maintain the previously established reference point, the motors 41 and 43 are excited so as to drive their respective gearing lines back to their zero positions. This results in driving the combined motions of the two gearing lines back into the potentiometer 63, thereby updating the position of the vehicle with respect to the reference point. After the run out of data is completed, the motors 41 and 43 are braked, locking the output of differential 65 and forcing any further X motion onto the potentiometer 63. When the new receiver is deposited in the water, the motor 64 is locked and motor 43 is released, permitting the translation of the wiper arms of potentiometers 34 and 35.

Clutches 45 and 53 are preferably added to dispense with the need for external gating of the input signals to the navigational computer. That is, in the conventional type of navigational devices which are utilized to generate the input signal for the navigational computer 30, a gate would have to be provided between such a navigational device and the input shaft of computer 30. Clutches 45 and 53 avoid the necessity for such a gate, by remaining open during flight conditions, during which time navigational computer 30 is not storing information. During that time motors 64, 68 and 49 are unexcited and braked. Thus, any rotation of the input shaft corresponding to motion of the vehicle is dissipated in the uncoupled clutches 45, 53.

After all measurements have been completed and it is desirable to extinguish the stored memory, clutches 45 and 53 are opened and all six motors (41, 43, 64, 49, 51, 68) are unlocked and connected to their respective geared switches, and all gearing lines returned to zero. Thus, is is seen that navigational computer 30 automatically yields output signals corresponding to $\phi$ and 2C, which signals may be referred to a chosen coordinate system, and undated should it be desirable to employ successive pulse sources with an established receiver network. When three channels are connected in a complete system, as shown in FIGURE 4, each elliptical sweep generator is coupled to a navigational computer as shown in FIGURE 5. As the receiver corresponding to each particular channel is deposited in the water, the computer channel of its associated navigational computer will be signalled so that the generation of $\phi$ and 2C for that channel may commence.

The values of $\phi$ and 2C are then presented to an elliptical sweep generator, one for each channel, as shown in FIGURES 8 and 8a. This sweep generator is similar to that described in my aforementioned U.S. Patent No. 3,112,484, with the exception that the input clock signal generator 100 is no longer synchronized to the directivity of the previously employed directional receiver. The system is designed around a one-kilocycle timing clock, so that an ellipse will be swept once in $1/1{,}000$ of a second. This permits the display to reproduce an ellipse for the shortest pulse that is presently expected to be received. If a longer pulse is received, as will normally be the case, the ellipse will be swept out many times during the time interval that the signal is present and the scope brightened. Hence, the displayed width of the ellipse will be a direct function of the pulse width down to the shortest expected pulse. If shorter pulses than one millisecond are expected, then the system may be modified to utilize a higher speed clock, and the appropriate modifications would be made in the various components to compensate for such shortened response time.

Elliptical sweep generator 20 may be divided into the following constituent components:

I. A section for the generation of a voltage instantaneously equal to cosine $(\theta - \phi)$.

II. A section for the generation of a voltage equal to the half-distance C between the sound source 11 and receiver 10, as well as for the multiplication of other functions by C.

III. A section for generation of time functions and multiplication of other functions by time, and reset to zero.

IV. A section for the division of the previously generated functions to produce the instantaneous range $r$.

V. A section for the multiplication of $r$ by the sine and cosine of the angle θ to produce the instantaneous horizontal and vertical deflection voltages for the cathode ray tube display.

Elliptical sweep generator 20 will operate with pulses which are either repeated regularly or with pulses that occur with irregularity. The system is not synchronized to the incoming pulse, and the effect of the irregularity on the source of pulses would merely be to require a cathode ray display tube having sufficient persistence characteristics.

*Section I: Production of voltages equal to cosine θ—φ*

As shown in my aforementioned copending U.S. patent application Serial No. 76,935, it is desirable to employ a sine wave generator to produce the cosine characteristic. This is preferably accomplished by delaying the sine wave generator triggering pulse by 270°. Curve 37 in FIGURE 9 shows a cosine wave synchronized to the output signal of 1 kilocycle input clock signal generator 100. However, a standard type of synchronized oscillator produces a sine wave voltage synchronized to the reference pulse 36 as shown by curve 38, it being understood that the function of time in all illustrations of FIGURE 9 runs along from left to right as increasing abscissa values. Since it is not feasible, after receipt of the timing pulse, to move back into time in order that the voltage generation may have been begun earlier, another method of generating a cosine wave must be used. As contemplated, the "first" timing pulse will be delayed for a time equal to 270° in phase angle. All subsequent sine waves will then be synchronized as cosine voltage with the reference pulses. This delay is illustrated on curve 37, where $S_1$ is the desired but impossible starting point and $S_2$ is the starting point synchronized with a pulse 36 delayed by 270°. This is the method to be used by which a voltage is produced that has instantaneous values equal to the cosine of theta (θ).

In order to produce an instantaneous voltage equal to the cosine of theta (θ) minus phi (φ), the starting pulse 39 must be further delayed to introduce the angle phi (φ). It should be emphasized that these phase delays are real time delays which only affect the sweep generation during the first complete cycle, as for instance the first millisecond of the computation.

Reference is now made to that section of the apparatus diagram in FIGURE 8 which is designated Section I as well as to the wave form shown in FIGURE 10. For clarifying the explanation, the location on FIGS. 8, 8a of waveforms identified by alphabetical letters in FIG. 10 will be shown by the same letters circumscribed by circles.

Input clock signal generator 100 provides an input clock signal shown as curve *a* in FIG. 10. It will be assumed, for the sake of example only, that the clock signal has a time period of 1000 microseconds. Such angle reference pulse *a* is applied to a one-shot multivibrator 102 to produce a phase delay of 270°/2 which is shown as curve *b*. The inverted output from one-shot multivibrator 102 is employed in a manner so that its positive rising edge (which is delayed by 270°/2) triggers a one-shot multivibrator 104 which produces another delay of 270°/2 as shown by curve C. The total delay of the pulse through one-shot multivibrators 102 and 104 is 270°, such delay being required in order to produce a cosine function with a sine wave generator as previously explained in connection with curve 37 in FIG. 9. Preferably two one-shot multivibrators are used to produce the total required delay of 270° since the units are normally limited in their permissible duty cycle. Alternatively, other pulse delay techniques well-known in the art may be used.

A delay which is a function of the bearing angle phi (φ) must now be introduced to generate a voltage cos (θ—φ) as required by derived Formula 1. Accordingly, the inverted output of multivibrator 104 triggers a one-shot multivibrator 106 which is automatically controlled by the φ output of navigational computer 30 to provide a delay of φ/2 as shown by curve *d*. The inverted output of multivibrator 106 triggers a one-shot multivibrator 116 which is also controlled by the φ output of navigational computer 30 to produce a similar delay of φ/2 as shown by curve *e*. The inverted output of one-shot multivibrator 116 triggers a pulse amplifier 120 to produce pulses of a predetermined width as shown by curve *f* synchronized to the positive rising edge of the output of the one-shot multivibrator 116. The phase position of the output pulse *f* from pulse amplifier 120 is equal to the total delay produced by all preceding elements 102, 104, 106 and 116 or 270°+φ and is used to trigger a synchronized sine wave generator 122. The instantaneous voltage output of sine wave generator 122 is the cosine of the angle theta minus phi, cos (θ—φ) as shown by curve *g* in FIG. 10 or curve 40 in FIG. 9.

*Section II: Generation of a voltage equal to the half distance C between the sound source B and the receivers and multiplication of other functions by C*

Reference will now be made to Section II of FIG. 8 together with waveform diagrams shown in FIG. 10.

Multiplication by the factor C (the half distance between the source 11 and receiver 10) is accomplished by presenting the navigational computer 2C output to variable attenuators 124 and 126 which may be potentiometers automatically adjusted by a common shaft 125 of potentiometer 124 and 126 in accordance with the navigational computer output. This value of 2C is changed to C by appropriate gear ratios on shaft 125 (not shown). As shown in FIG. 8, the signal output *g* from generator 122 is applied as excitation to potentiometer 124. The voltage out of wiper 128 of potentiometer 124, referred to a zero end 130 of its resistive winding, is $$C \cos (\theta - \phi)$$

Potentiometer 126 is excited by a D.C. reference voltage as from a battery 132. The voltage out of wiper 134 of potentiometer 126 referred to zero grounded end 135 of its resistive winding is a pure function of C.

The zero end 130 of the resistive winding of potentiometer 124 is raised above ground by the value of the function $800t+C$ as will be described hereinafter. The voltage out of the wiper 128 of potentiometer 124, referred to ground, therefore will be $800t+C-C \cos (\theta-\phi)$.

*Section III: Generation of time functions and multiplication of other functions by time and reset to zero*

As previously stated, the device of FIG. 8 is not synchronized to the input signal. The input signal to Seciton III will trigger the elliptical sweep generator. After the generator is triggered, a subsequently received signal cannot effect the apparatus in Section III until after the gate (to be described later) is reset which will be long after the longest time at which a signal may appear has passed. A sample of the incoming telemetered signal as shown by wave *h* in FIG. 10 is applied to a linear amplifier 142 by an output lead 143. The amplified signal is applied to a signal attenuator 144 which may be a potentiometer. This attenuator permits the operator to set the gain of the system as by a hand crank 146 so that the rest of Section III will be sensitive only to a prime water pulse from the signal source, which will be the strongest signal, rather than to some random noise.

A signal shown as curve *j* that has passed the test of attenuation of the potentiometer 144 will trigger pulse amplifier 148 by preadjustment of such amplifier. This amplifier will not respond to signals of less than a fixed value, thereby rejecting spurious signals and noises that are below acceptable voltage level after attenuation. The output of amplifier 148 shown as curve *k* is a pulse of standard width and level. This signal is applied to the "set" input 150 of a flip-flop 152 to provide the function known as opening of the "gate" and occurs at the time the direct path pulse is received. The output of element 152, a pulse or curve 1 of FIG. 10 of "indefinite" length occurring at the time the "set" input is triggered, is applied to an input 154 of a gate 156. The input clock signal, represented by curve *m* is continuously applied to an input 158 of gate 156 by a lead 160. However, the clock signal does not appear at the output 162 until after the application of the gating signal 1 from element 152. The output of gate 156, as shown by curve *m* is then applied to a count down circuit consisting of elements 164, 166, 168, 170 and 172, all of which are flip-flops that are turned on and off by the positive leading edge of signals applied to their respective inputs. Since it takes two pulses at the input to produce one pulse (of increased width) at the output, each of said flip-flops 164, 166, 168, 170 and 172 divides the number of input pulses by two. The output of element 172 is, therefore, a 31.25 c./s. pulse (1,000 c.s./2/2/2/2/2) of suitable width for use by the succeding elements. This 31.25 c./s. pulse is applied to a power amplifier 174 which is capable of providing sufficient power during the pulse time to energize relay 176 on FIG. 8a. Relay 176, by closing the circuit to a D.C. battery 178, provides additional power amplification to the pulse to operate stepping motor 180. The employment of flip-flops 164, 166, 168, 170 and 172 for converting a 1000 c./s. signal to a 31.25 c./s. signal is to be considered optional but preferable since commercially available models of stepping motors do not generally operate above 50 c./s. If higher speed stepping motors would be available, fewer count down elements would be required. The rotational output upon a shaft 182 of stepping motor 180 is applied to potentiometers 184, 186 and 188 through mechanical differentials 189 and 190. Output shaft 182 from 180 is mechanically coupled to an input of differential 189 as well as to a variable speed drive 191 by a shaft 192, the output of 191 being coupled to another input of differential 189 by a shaft 193. Accordingly, output shaft 194 of differential 189 can rotate at a different speed than stepping motor shaft 182 as effected by a selective adjustment of variable speed drive 191. Also output shaft 194 of differential 189 is able to drive an output shaft 196 of differential 190, which rotates wipers 197 and 198 of potentiometers 184 and 186, respectively, in 1:1 speed correspondence when another input shaft 199 of differential 190 is held stationary. The variable speed drive 191, by manually operable crank 200, permits compensation of the Section III computer for the different speed of sound in water under certain operating conditions, a calibrated indicator 201 for the local speed of sound in water being provided for the convenience of the operator. The computational values of potentiometers 184, 186, 188 have been designed for the nominal value for the speed of sound in water of 1600 yards per second. In the event that it is known that the water condition is such that the true value at the moment is greater or less than the nominal, the gear ratio from the stepping motor 180 to the potentiometers may be adjusted proportionately.

Stepping motor 180 rotates one input gear of mechanical differential 189 and the input disc of element 191. Rotation of the disc is transferred to the output roller in proportion to the position of the ball carriage. This output rotation is applied to the other input gear of differential 189, adding or subtracting to the first input.

A limit stop 202 prevents the possibility of physical damage to the potentiometer should their mechanical inputs exceed their physical capacity. The potentiometers 184, 186 and 188 are geared preferably to the stepping motor 180 in the ratio of 1:2:4 in order to produce the mechanical functions of 400*t* 800*t* and 1600*t*. A D.C. reference voltage, as by a battery 204, is applied to potentiometers 184 and 186 so that the voltages out of their respective wipers 197 and 198, referred to the zero end of their respective resistive windings, will be equal to 400*t* and 800*t*. Calibrating trim resistors, not shown, may be added. The zero ends of the resistive windings are raised above ground potential by the application of a voltage proportional to the distance C as generated by potentiometer 126 on wiper 134 (see FIG. 8) by an electrical connection 206 therebetween. The voltage out of wiper 197 of potentiometer 184, referred to ground, is therefore equal to the function 400*t*+*C*. The voltage out of the wiper 198 of potentiometer 186 is, similarly, equal to the function 800*t*+*C*. The voltage from wiper 197 which is equal to 400*t*+*C* is applied as the excitation for potentiometer 188 whose mechanical input is proportional to 1600*t*. The output from wiper 208 of potentiometer 188 is the product of the two functions, 1600*t* (400*t*+*C*). The excitation for potentiometer 188 is provided preferably through an isolation amplifier 210 in order to prevent potentiometer 188 from loading potentiometer 184.

The total length of the function time that must be generated is dependent on the desired surveillance range (see FIG. 3). For instance, if a range of 20,000 yards is expected, a minimum of 25 seconds will be allowed to permit a target at that range and on the opposite bearing from the sound source to arrive at the receiver. Changes in scale can be readily made by adjusting the excitation voltage levels. Means for doing this are not shown but well-known in the art.

At the end of the maximum time interval fixed by the range, and before initiation of the next sound pulse, the potentiometers 184, 186 and 188 (FIG. 8a), which are rotated as a function of time, must be reset to zero and the timing gate 152 (FIG. 8) closed. The resetting signal is produced by a geared switch shown 212 (FIG. 8a). The switch 212 has a D.C. input, as by a battery 214 and is closed after a time interval equal to the range of interest or when the computational limit of the potentiometers has been reached and thereby provides a clearing voltage to "reset" input 216 of flip-flop 152 (FIG. 8) over lead connection 218. This clearing voltage closes the gate 156 cutting off the drive to stepping motor 180. At the same time switch 212 provides a voltage to a reset motor 220 which returns the wipers 197, 198 and 208 of the potentiometers 184, 186 and 188 to their zero ends, respectively, through the input shaft 199 of differential 190. When this action has been completed the timing section is prepared to receive the next initiating pulse.

*Section IV: Division of generated functions to produce r*

The generation of the following two functions has been described previously:

1600*t* (400*t*+*C*) on wiper 208 of potentiometer 188 (FIG. 8a)

and

800*t*+*C*−*C* cos (*θ*−*φ*) on wiper 128 of potentiometer 124 (FIG. 8).

As they appear in the elliptical locus Equation 1, these are the numerator and denominator that define the range or quantity *r*. These two functions are applied by connections 222 and 224, respectively, to a commercially available type of D.C. electronic divider 226 (FIG. 8) in order to produce the quantity *r*. These two input functions are sinusoids varying in zero level in accordance with the quantities concerned in their generation. While it may appear to be an anomaly to place an A.C. signal into a D.C. divider, such units are capable of handling the rapid change input voltage. It is more correct to consider that this is a D.C. computer whose functions vary at a one kilocycle rate. The time varying function (*r*) appearing as the output of divider 226 is shown in FIGURE 10*a* for a particular, but arbitrary, chosen ellipse.

*Section V: Multiplication of r by the sine and cosine of the angle theta to produce the X and Y sweep deflection voltages*

It is necessary at this point to generate sine and cosine functions of the angle theta ($\theta$). The input clock signal $a$ (FIG. 10) from generator 100 is applied to the input of pulse amplifier 228 over lead 227. This element provides, at its output, a pulse of predetermined standard width and level that is synchronized to the clock signal. This pulse is then used to synchronize a sine wave generator 230 having a frequency equal to the clock pulse rate which is assumed to be 1K c./s. The output of this locked oscillator is a voltage whose instantaneous value is a function of the sine of the angle theta. This voltage is then applied to a D.C. multiplier 232 whose other input is connected to the output of divider 226, the function $r$. The output of element 232 upon lead 234, is, therefore, the function $r$ sine $\theta$, as shown in FIGURE 10$a$.

The function $r$ cosine $\theta$ is generated upon lead 236 in a similar manner except that the input to lead 237 of pulse amplifier 238 is the reference clock pulse after it has been delayed by a phase angle of 270° as previously described and shown as curve $c$ of FIGURE 10. When this delayed pulse from the output of element 104 is applied to a 1K c./s. sine wave generator 240, a cosine voltage function is generated that is synchronized to the reference clock pulse. This cosine function is then applied to one input of a multiplier 242. The other input to 242 is the output of divider 226 or the function $r$, so that the output of 242 is the function $r$ cosine $\theta$ on lead 236, as shown in FIG. 10$a$.

The function $r$ sine $\theta$ on lead 234 is applied to X deflection plates 244 of the display oscilloscope 150 and the function $r$ cosine $\theta$ on lead 236 is applied to Y deflection plates 246. The cathode ray beam of tube 50 under the influence of the voltages on its horizontal and vertical plates will display the solution to Equation 1 as previously derived, for displaying the elliptical locus of one of the channels.

Similar equipment in the other channels will generate the other elliptical foci; the intersection of which establishes the location of the target.

Thus, my invention provides an automatic plotting system for an EER intersecting ellipse target locating system, whereby the telemetered signals automatically produce a display immediately upon receipt thereof; thereby permitting operating personnel to make an evaluation of the data more rapidly than has heretofore been possible.

In the foregoing I have described my invention in conjunction with a preferred embodiment thereof. Many variations and modifications within the spirit and scope of my invention will now be apparent to those skilled in the art. Accordingly, I prefer to be bound not by the specific disclosure herein, but only by the appended claims.

The embodiments of the invention in which an exclusive privilege or property is claimed are defined as follows:

1. A target locating system comprising a source of pulsed wave energy; an omnidirectional wave energy receiver; display means tracing a curve having its foci at said source and said receiver, respectively, to establish target positions from which a pulse of wave energy reflected from said target to said receiver arrives at a time after the unreflected pulse of wave energy traveling directly from said source to said receiver; a navigational computer coupled to said display means; said navigational computer having means for generating a first output signal related in magnitude to the orientation of said receiver to said source.

2. A target locating system comprising a source of pulsed wave energy; an omnidirectional wave energy receiver spaced apart from said source; display means tracing an ellipse with foci at said source and said receiver, respectively, to establish the locus of target positions from which a pulse of wave energy reflected from said target to said receiver arrives at a time after the unreflected pulse of wave energy traveling directly from said source to said receiver; a navigational computer coupled to said display means; said navigational computer having means for generating a first output signal related in magnitude to the orientation of the major axis of said ellipse with respect to a reference direction.

3. A target locating system comprising a source of pulsed wave energy; an omnidirectional wave energy receiver spaced apart from said source; display means tracing an ellipse with foci at said source and said receiver, respectively, to establish the locus of target positions from which a pulse of wave energy reflected from said target to said receiver arrives at a time after the unreflected pulse of wave energy traveling directly from said source to said receiver; a navigational computer coupled to said display means; said navigational computer having means for generating an output signal related in magnitude to the distance between said receiver and said source.

4. A target locating system comprising a source of pulsed wave energy; an omnidirectional wave energy receiver spaced apart from said source; display means tracing an elipse with foci at said source and said receiver, respectively, to establish the locus of target positions from which a pulse of wave energy reflected from said target to said receiver arrives at a time after the unreflected pulse of wave energy traveling directly from said source to said receiver; a navigational computer coupled to said display means; said navigational computer having means for generating a first and second output signal; said first output signal related in magnitude to the orientation of the major axis of said ellipse with respect to a reference direction; said second output signal related in magnitude to the distance between said receiver and said source.

5. A target locating system comprising a source of pulsed wave energy; an omnidirectional wave energy receiver spaced apart from said source; display means tracing an ellipse with foci at said source and said receiver, respectively, to establish the locus of target positions from which a pulse of wave energy reflected from said target to said receiver arrives at a time after the unreflected pulse of wave energy traveling directly from said source to said receiver; a navigational computer coupled to said display means; said navigational computer having means for generating a first and second output signal; said first output signal related in magnitude to the orientation of the major axis of said ellipse with respect to a reference direction; said second output signal related in magnitude to the distance between said receiver and said source; means for producing a first and second input signal for presentation to said navigational computer; one of said input signals being related in magnitude to the reference direction component of the distance between said receiver and said source; and the other of said input signals being related in magnitude to the quadrature component of said distance.

6. A target locating system comprising a source of pulsed wave energy; an omnidirectional wave energy receiver spaced apart from said source; display means tracing an ellipse with foci at said source and said receiver, respectively, to establish the locus of target positions from which a pulse of wave energy reflected from said target to said receiver arrives at a time after the unreflected pulse of wave energy traveling directly from said source to said receiver; a navigational computer coupled to said display means; said navigational computer having means for generating a first and second output signal; said first output signal related in magnitude to the orientation of the major axis of said ellipse with respect to a reference direction; said second output signal related in magnitude to the distance between said receiver and said source; means for producing a first and second input signal for presentation to said navigational computer; one of said input signals being related in magnitude to the reference direction component of the distance between said receiver and said source; and the other of said input signals being related in magnitude to the quadrature component of said distance; a first and second combining circuit; a sine-cosine resolver circuit connected to each of said combining circuits for excitation thereof; circuit means connecting said first and second input signals to said first and second combining circuits.

7. A target locating system comprising a source of pulsed wave energy; an omnidirectional wave energy receiver spaced apart from said source; display means tracing an ellipse with foci at said source and said receiver respectively, to establish the locus of target positions from which a pulse of wave energy reflected from said target to said receiver arrives at a time after the unreflected pulse of wave energy traveling directly from said source to said receiver; a navigational computer coupled to said display means; said navigational computer having means for generating a first and second output signal; said first output signal related in magnitude to the orientation of the major axis of said ellipse with respect to a reference direction; said second output signal related in magnitude to the distance between said receiver and said source; means for producing a first and second input signal for presentation to said navigational computer; one of said input signals being related in magnitude to the reference direction component of the distance between said receiver and said source; and the other of said input signals being related in magnitude to the quadrature component of said distance; a first and second combining circuit; a sine-cosine resolver circuit connected to each of said combining circuits for excitation thereof; circuit means connecting said first and second input signals to said first and second combining circuits; circuit means interconnecting said combining circuits to produce a first composite signal; circuit means coupling said first composite signal to said resolver to effect balancing thereof; said resolver output establishing said computer first output signal.

8. A target locating system comprising a source of pulsed wave energy; an omnidirectional wave energy receiver spaced apart from said source; display means tracing an ellipse with foci at said source and said receiver, respectively, to establish the locus of target positions from which a pulse of wave energy reflected from said target to said receiver arrives at a time after the unreflected pulse of wave energy traveling directly from said source to said receiver; a navigational computer coupled to said display means; said navigational computer having means for producing a first and second output signal; said first output signal related in magnitude to the orientation of the major axis of said ellipse with respect to a reference direction; said second output signal related in magnitude to the distance between said receiver and said source; means for producing a first and second input signal for presentation to said navigational computer; one of said input signals being related in magnitude to the reference direction component of the distance between said receiver and said source; and the other of said input signals being related in magnitude to the quadrature component of said distance; a first and second combining circuit; a sine-cosine resolver circuit connected to each of said combining circuits for excitation thereof; circuit means connecting said first and second input signals to said first and second combining circuits; circuit means interconnecting said combining circuit to produce a composite signal; a balancing circuit; circuit means coupling said composite signal to said balancing circuit; said balancing circuit output establishing said computer second output signal.

9. A target locating system comprising a source of pulsed wave energy; an omnidirectional wave energy receiver spaced apart from said source; display means tracing an ellipse with foci at said source and said receiver, respectively, to establish the locus of target positions from which a pulse of wave energy reflected from said target to said receiver arrives at a time after the unreflected pulse of wave energy traveling directly from said source to said receiver; a navigational computer coupled to said display means; said navigational computer having means for producing a first and second output signal; said first output signal related in magnitude to the orientation of the major axis of said ellipse with respect to a reference direction; said second output signal related in magnitude to the distance between said receiver and said source; means for producing a first and second input signal for presentation to said navigational computer; one of said input signals being related in magnitude to the reference direction component of the distance between said receiver and said source; and the other of said input signals being related in magnitude to the quadrature component of said distance; a first and second combining circuit; a sine-cosine resolver circuit connected to each of said combining circuits for excitation thereof; circuit means connecting said first and second input signals to said first and second combining circuits; circuit means interconnecting said combining circuits to produce a first and second composite signal; circuit means coupling said first composite signal to said resolver to effect balancing thereof; said resolver output establishing said computer first output signal; circuit means interconnecting said combining circuits to produce a second composite signal; a balancing circuit; circuit means coupling said second composite signal to said balancing circuit; said balancing circuit output establishing said computer second output signal.

10. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto.

11. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto; said navigational computer having a first output signal for each of said channels related in magnitude to the orientation of the major axis of said channelized elliptical locus with respect to a reference direction.

12. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto; said navigational computer having an output signal for each of said channels related in magnitude to the distance between said channel receiver and said common pulse source.

13. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto; said navigational computer having a first and second output signal for each of said channels, said first output signal related in magnitude to the orientation of the major axis of said channelized elliptical locus with respect to a reference direction; said second output signal related in magnitude to the distance between said channel receiver and said common pulse source.

14. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto; said navigational computer having a first and second output signal for each of said channels, said first output signal related in magnitude to the orientation of the major axis of said channelized elliptical locus with respect to a reference direction; said second output signal related in magnitude to the distance between said channel receiver and said common pulse source; means for producing a first and second input signal for presentation to said navigational computer; one of said input signals being related in magnitude to the reference direction component of the distance between said channel receiver and said common source; and the other of said input signals being related in magnitude to the quadrature component of said distance.

15. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto; said display means and navigational computer being vehicle carried; means for producing resolved components of the change of vehicle position; first means coupling said resolved components of the change of position of said vehicle to said navigational computer; second means responsive to said channel receivers and common source location, coupled to said navigational computer.

16. A target locating system comprising a multi-channel display means; a plurality of telemetering channel receivers; means interconnecting said multi-channel display means to said plurality of telemetering channel receivers; each of said receivers establishing a channelized elleptical locus of target position; a source of pulsed wave energy at the common focus thereof; the intersection of said elliptical loci locating said target; a navigational computer coupled to said display means to automatically present the relative orientation of said receivers and source thereto; said navigational computer having a first and second output signal for each of said channels, said first output signal related in magnitude to the orientation of the major axis of said channelized elliptical locus with respect to a reference direction; said second output signal related in magnitude to the distance between said channel receiver and said common pulse source; said display means and navigational computer being vehicle carried; means for producing resolved components of the change of vehicle position; first means coupling resolved components of the change of position of said vehicle to said navigational computer; second means responsive to said channel receivers and common source location, coupled to said navigational computer.

17. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto; said navigational computer having a first and second output signal for each of said channels, said first output signal related in magnitude to the orientation of the major axis of said channelized elliptical locus with respect to a reference direction; said second output signal related in magnitude to the distance between said channel receiver and said common pulse source; said display means and navigational computer being vehicle carried; means for producing resolved components of the change of vehicle position; first means coupling resolved components of the change of position of said vehicle to said navigational computer; second means responsive to said channel receivers and common source location, coupled to said navigational computer; a first and second combining circuit; and third means activated by said second means and including means for coupling said resolved components to said first and second combining circuit.

18. A target locating system in accordance with claim 17 wherein said third means includes a differential.

19. A target locating system comprising a multi-channel display means; a plurality of telemetering channel receivers; means interconnecting said multi-channel display means to said plurality of telemetering channel receivers; each of said receivers establishing a channelized elliptical locus of target positions; a source of pulsed wave energy at the common focus thereof; the intersection of said elliptical loci locating said target; a navigational computer coupled to said display means to automatically present the relative orientation of said receivers and source thereto; said navigational computer having a first and second output signal for each of said channels, said first output signal related in magnitude to the orientation of the major axis of said channelized elliptical locus with respect to a reference direction; said second output signal related in magnitude to the distance between said channel receiver and said common pulse source; said display means and navigational computer being vehicle carried; means for producing resolved components of the change of vehicle position; first means coupling resolved components of the change of position of said vehicle to said navigational computer; second means responsive to said channel receivers and common source location, coupled to said navigational computer; a first and second combining circuit; and third means activated by said second means and including means for coupling said resolved components to said first and second combining circuit; a sine cosine resolver for said combining circuits; each of said combining circuits being excited by said sine-cosine resolver; circuit means interconnecting said combining circuits to produce a first and second composite signal; circuit means coupling said first composite signal to said resolver to effect balancing thereof; said resolver output establishing said computer first output signal; a balancing circuit; circuit means coupling said second composite signal to said balancing circuit; said balancing circuit output establishing said computer second output signal.

20. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto; said navigational computer having a first and second output signal for each of said channels, said first output signal related in magnitude to the orientation of the major axis of said channelized elliptical locus with respect to a reference direction; said second output signal related in magnitude to the distance between said channel receiver and said common pulse source; said display means and navigational computer being vehicle carried; means for producing resolved components of the change of vehicle position; first means coupling resolved components of the change of position of said vehicle to said navigational computer; second means responsive to said channel receivers and common source location, coupled to said navigational computer; a first and second combining circuit; and third means activated by said second means and including means for coupling said resolved components to said first and second combining circuit; a fourth means activated by said second means and including means for storing said resolved components subsequent to the location of said channel receiver.

21. A target locating system in accordance with claim 20 wherein said fourth means includes a brake motor, differential and geared switch.

22. A target locating system in accordance with claim 20 wherein said third and fourth means include a common differential; said first means coupled to a first input of said differential; a first brake motor coupled to a second input of said differential; a second brake motor coupled to the output of said differential; said second brake motor locking said differential output, and said first brake motor releasing said second differential input when said fourth means is activated; a first storage means operatively connected to said second differential input.

23. A target locating system in accordance with claim 20 wherein said third and fourth means include a common differential; said first means coupled to a first input of said differential; a first brake motor coupled to a second input of said differential; a second brake motor coupled to the output of said differential; said second brake motor releasing said differential output, and said first brake motor locking said second differential input when said third means is activated; said differential output being connected to said combining circuit.

24. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto; said navigational computer having a first and second output signal for each of said channels, said first output signal related in magnitude to the orientation of the major axis of said channelized elliptical locus with respect to a reference direction; said second output signal related in magnitude to the distance between said channel receiver and said common pulse source; said display means and navigational computer being vehicle carried; means for producing resolved components of the change of vehicle position; first means coupling resolved components of the change of position of said vehicle to said navigational computer; second means responsive to said channel receivers and common source location, coupled to said navigational computer; a first and second combining circuit; and third means activated by said second means and including means for coupling said resolved components to said first and second combining circuit; a fourth means for storing the resolved components prior to the location of said channel receiver; said second means including means for deactivating said fourth means.

25. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto; said navigational computer having a first and second output signal for each of said channels, said first output signal related in magnitude to the orientation of the major axis of said channelized elliptical locus with respect to a reference direction; said second output signal related in magnitude to the distance between said channel receiver and said common pulse source; said display means and navigational computer being vehicle carried; means for producing resolved components of the change of vehicle position; first means coupling resolved components of the change of position of said vehicle to said navigational computer; second means responsive to said channel receivers and common source location, coupled to said navigational computer; a first and second combining circuit; and third means activated by said second means and including means for coupling said resolved components to said first and second combining circuit; a fourth means activated by said second means and including means for storing said resolved components subsequent to the location of said channel receiver; a fifth means for storing the resolved components prior to the location of said channel receiver; said second means including means for deactivating said fifth means.

26. A target locating system comprising a multi-channel display means; a plurality of telemetering channel receivers; means interconnecting said multi-channel display means to said plurality of telemetering channel receivers; each of said receivers establishing a channelized elliptical locus of target position; a source of pulsed wave energy at the common focus thereof; the intersection of said elliptical loci locating said target; a navigational computer coupled to said display means to automatically present the relative orientation of said receivers and source thereto; said navigational computer having a first and second output signal for each of said channels, said first output signal related in magnitude to the orientation of the major axis of said channelized elliptical locus with respect to a reference direction; said second output signal related in magnitude to the distance between said channel receiver and said common pulse source; said display means and navigational computer being vehicle carried; means for producing resolved components of the change of vehicle position; first means coupling resolved components of the change of position of said vehicle to said navigational computer; second means responsive to said channel receivers and common source location, coupled to said navigational computer; a first and second combining circuit; and third means activated by said second means and including means for coupling said resolved components to said first and second combining circuit; a fourth means activated by said second means and including means for storing said resolved components subsequent to the location of said channel receiver; a second common source; said fourth means responsive by the location of said second common source to effect coupling of the signal in said fourth means to said first and second combining circuit.

27. In an explosive echo ranging target locating system, including a common source of pulsed wave energy; a multichannel display; a navigation computer; means coupling said navigational computer to said multichannel display adapted to simultaneously display a plurality of elliptical target position loci; a similar plurality of channel receivers operatively connected to said display; said navigational computer including means to automatically establish output signals related in magnitude to the orientation of said channel receivers with respect to the common source of pulsed wave energy.

28. In an explosive echo ranging target locating system, including a successive plurality of common sources of pulsed wave energy; a multichannel display; a navigation computer; means coupling said navigational computer to said multichannel display adapted to simultaneously display a plurality of elliptical target position loci; a similar plurality of channel receivers operatively connected to said display; said navigational computer including means to automatically establish output signals related in magnitude to the orientation of said channel receivers with respect to the successive plurality of common sources of pulsed wave energy.

29. In an explosive echo ranging target locating system, including a common source of pulsed wave energy; a multichannel display; a navigation computer; means coupling said navigational computer to said multichannel display adapted to simultaneously display a plurality of elliptical target position loci; a similar plurality of channel receivers operatively connected to said display; said navigational computer including means to establish output signals related in magnitude to the orientation of said channel receivers with respect to the common source of pulsed wave energy, and including means to establish the location of said channel receivers with respect to a reference coordinate system.

30. In an explosive echo ranging target locating system; a multichannel display; a vehicle carried navigational computer; means coupling said navigational computer to said multichannel display adapted to simultaneously display a plurality of target position elliptical loci; a similar plurality of vehicle deposited channel receivers and a pulsed wave source; means operatively connected to said navigational computer to automatically indicate the depositing of said receivers and source; said navigational computer and channel receivers operatively connected to said display means; said navigational computer including means to establish output signals related in magnitude to the orientation of said channel receivers with respect to said source.

References Cited by the Examiner
UNITED STATES PATENTS

| | | | |
|---|---|---|---|
| 2,515,332 | 7/1950 | Budenbom | 343—15 |
| 3,090,958 | 5/1963 | Brown | 343—112 |
| 3,116,471 | 12/1963 | Coop | 340—2 |
| 3,160,846 | 12/1964 | Gustafson et al. | 340—3 |

CHESTER L. JUSTUS, *Primary Examiner.*

R. A. FARLEY, *Assistant Examiner.*